(12) United States Patent
Rose et al.

(10) Patent No.: US 7,441,804 B2
(45) Date of Patent: Oct. 28, 2008

(54) AIRBAG CUSHION FOLDING METHOD

(75) Inventors: Larry D. Rose, South Weber, UT (US); Marc Parker Russell, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 253 days.

(21) Appl. No.: 11/115,928

(22) Filed: Apr. 27, 2005

(65) Prior Publication Data

US 2006/0244248 A1  Nov. 2, 2006

(51) Int. Cl.
*B60R 21/237* (2006.01)

(52) U.S. Cl. .................. 280/743.1; 280/729

(58) Field of Classification Search ........... 280/743.1, 280/729
See application file for complete search history.

(56) References Cited

U.S. PATENT DOCUMENTS

| | | | | |
|---|---|---|---|---|
| 4,351,544 A * | 9/1982 | Ross | .................. | 280/743.1 |
| 4,842,300 A * | 6/1989 | Ziomek et al. | .............. | 280/732 |
| 5,004,266 A * | 4/1991 | Miller et al. | ............. | 280/743.2 |
| 5,140,799 A * | 8/1992 | Satoh | .................. | 53/429 |
| 5,290,061 A * | 3/1994 | Bollaert | ............... | 280/743.1 |
| 5,310,216 A * | 5/1994 | Wehner et al. | ........... | 280/743.1 |
| 5,398,968 A * | 3/1995 | Emambakhsh et al. | ... | 280/743.1 |
| 5,419,579 A * | 5/1995 | McPherson et al. | ...... | 280/743.1 |
| 5,454,595 A * | 10/1995 | Olson et al. | .............. | 280/743.1 |
| 5,538,281 A * | 7/1996 | Patercsak | .................. | 280/743.1 |
| 5,823,567 A * | 10/1998 | Behr et al. | .............. | 280/743.1 |
| 5,899,495 A * | 5/1999 | Yamamoto et al. | ...... | 280/743.1 |
| 5,979,937 A * | 11/1999 | Yoshida et al. | ........... | 280/743.2 |
| 6,110,094 A * | 8/2000 | Wallentin et al. | .......... | 493/454 |
| 6,155,598 A * | 12/2000 | Kutchey | .................. | 280/730.2 |
| 6,203,062 B1 * | 3/2001 | Kusaka et al. | ............ | 280/743.1 |
| 6,352,283 B1 * | 3/2002 | Ellerbrok et al. | ......... | 280/743.1 |
| 6,390,500 B1 * | 5/2002 | Yamada et al. | ........... | 280/743.1 |
| 6,432,033 B1 * | 8/2002 | Salzmann et al. | ........... | 493/231 |
| 6,692,024 B2 * | 2/2004 | Fischer et al. | ............. | 280/743.1 |
| 6,832,779 B2 * | 12/2004 | Tajima et al. | ............ | 280/743.1 |
| 6,988,743 B2 * | 1/2006 | Okamoto et al. | ......... | 280/743.1 |
| 2005/0134032 A1 * | 6/2005 | Downing et al. | ......... | 280/743.1 |
| 2006/0131847 A1 * | 6/2006 | Sato et al. | ................ | 280/730.2 |

* cited by examiner

*Primary Examiner*—Paul N. Dickson
*Assistant Examiner*—Timothy Wilhelm
(74) *Attorney, Agent, or Firm*—Sally J Brown; Stoel Rives LLP

(57) ABSTRACT

Disclosed are embodiments of methods for folding an airbag cushion into a housing. In one implementation of the inventive method, an airbag cushion defined by an upper panel and a lower panel is provided. A first portion of the airbag cushion is tucked into a second portion of the airbag cushion such that the upper and lower panels of the first portion are positioned in between the upper and lower panels of the second portion. The tucked portion is folded in towards the housing. First and second halves of the tucked airbag cushion are folded in towards the housing. Finally, the folded first and second halves of the airbag cushion are folded into the housing.

32 Claims, 5 Drawing Sheets

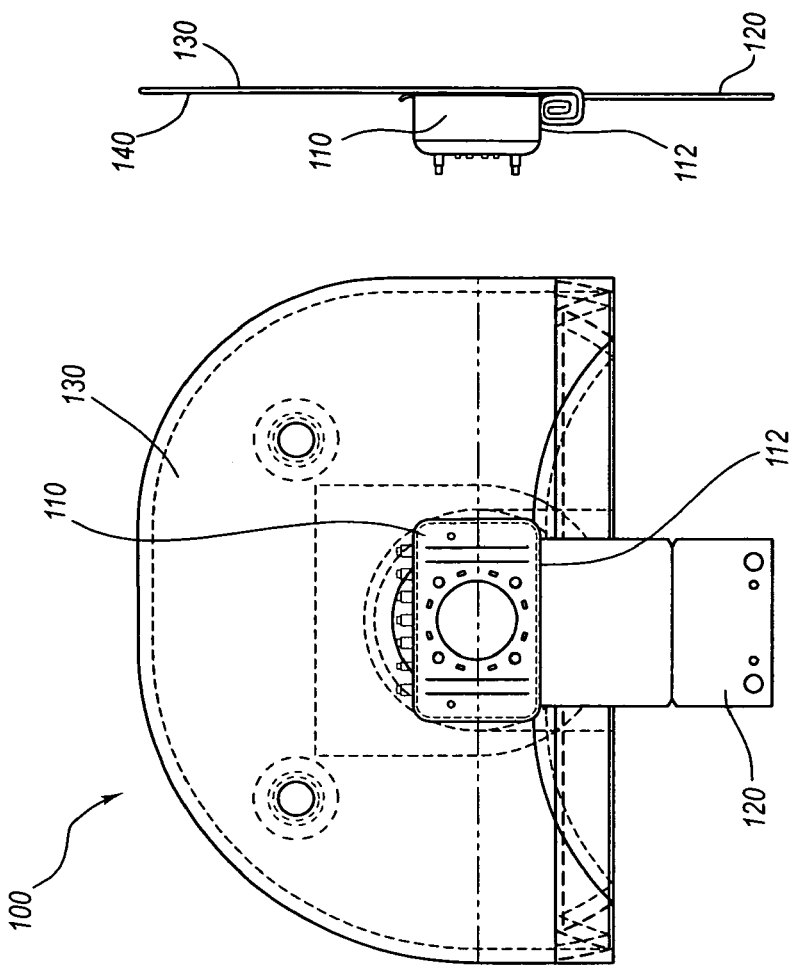
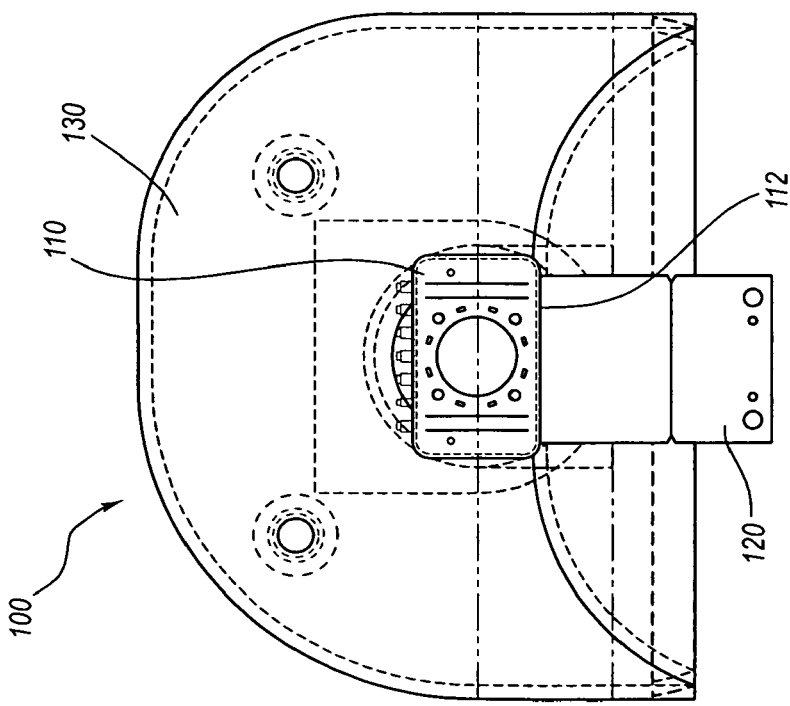
Fig. 3
Fig. 4A
Fig. 4B

AIRBAG CUSHION FOLDING METHOD

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which:

FIG. 3 is a top plan view of the airbag cushion assembly after a first fold has been applied to the tucked portion.

FIG. 4A is a top plan view of the airbag cushion assembly after additional folds have been applied to the tucked portion, such that one side of the folded tucked portion is at least approximately even with one side of the housing.

FIG. 4B is a side elevation view of the airbag cushion assembly at the same stage of the folding method as shown in FIG. 4A.

DETAILED DESCRIPTION OF PREFERRED EMBODIMENTS

Described below are embodiments of methods for folding automotive airbags. In the following description, numerous specific details are provided for a thorough understanding of the embodiments of the invention. However, those skilled in the art will recognize that the invention can be practiced without one or more of the specific details, or with other methods, components, materials, etc.

In addition, in some cases, well-known structures, materials, or operations are not shown or described in detail in order to avoid obscuring aspects of the invention. Furthermore, the described features, structures, steps, or characteristics may be combined in any suitable manner in one or more embodiments.

In one implementation of the inventive method, an airbag cushion defined by an upper panel and a lower panel is provided. A first portion of the airbag cushion is tucked into a second portion of the airbag cushion such that the upper and lower panels of the first portion are positioned in between the upper and lower panels of the second portion. The tucked portion is folded in towards the housing. First and second halves of the tucked airbag cushion are folded in towards the housing from opposite directions. Finally, the folded first and second halves of the airbag cushion are folded into the housing.

Figure 1:
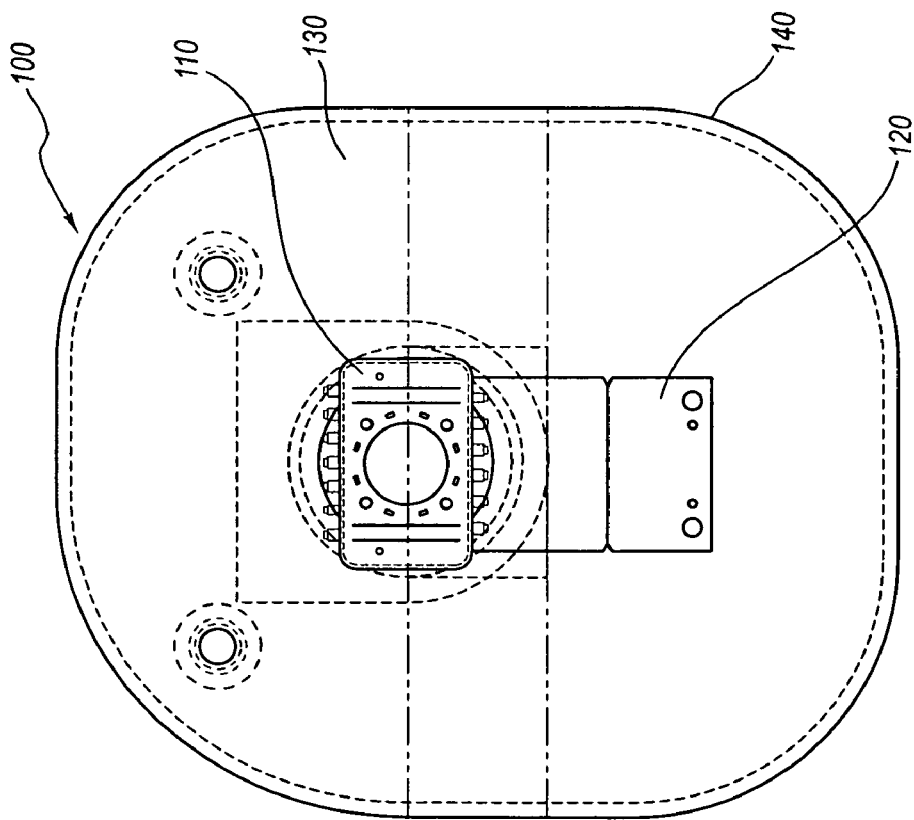
FIG. 1 is a top plan view of an embodiment of an airbag cushion assembly.

With reference now to the accompanying figures, an example of a method according to the invention will be described in greater detail. FIG. 1 depicts an airbag cushion 100 attached to a housing 110. A packaging flap 120 is also attached to the housing 110, and will be used to secure the airbag cushion 100 inside the housing 110 after the airbag cushion 100 has been completely folded into the housing 110, as described hereinafter. Airbag cushion 100 is defined by an upper panel 130 and a lower panel 140, which are attached to one another along the periphery of airbag cushion 100.

Figure 2:
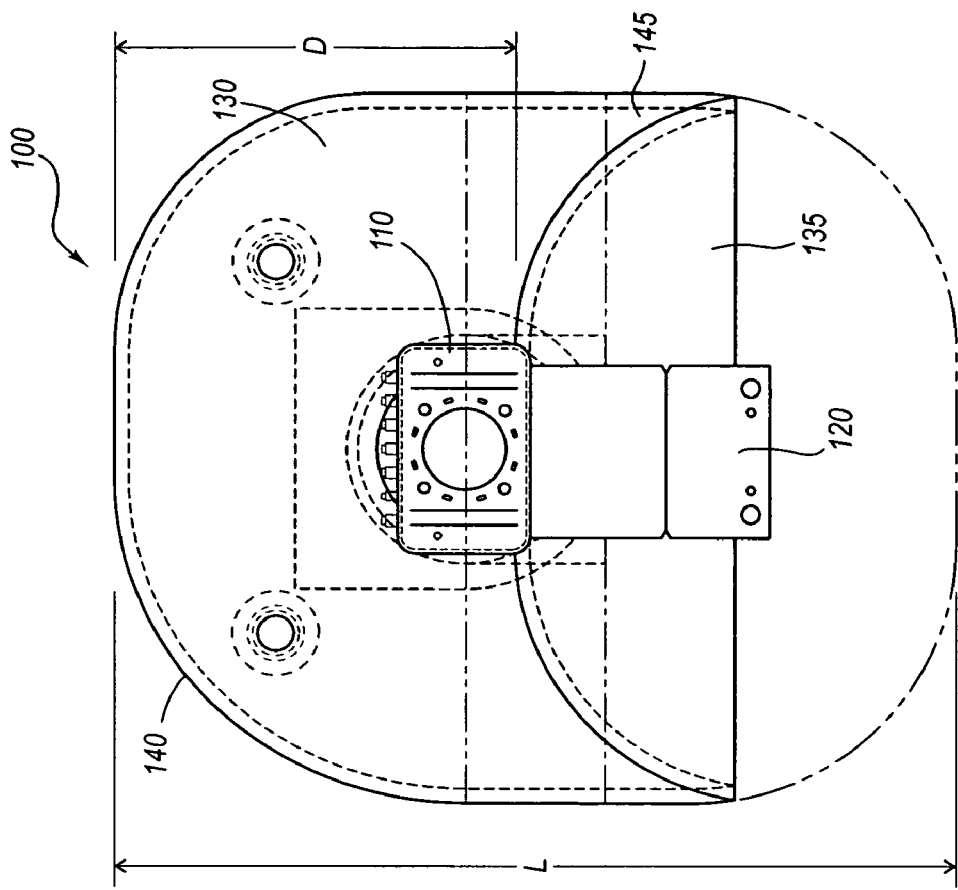
FIG. 2 is a top plan view of the airbag cushion assembly after a tucking step has been performed.

In one implementation of a method according to the invention, the airbag cushion 100 is tucked into itself, "outside-in" at one end. In other words, a first portion of the airbag cushion is tucked into a second portion of the airbag cushion such that the upper and lower panels of the first portion are positioned in between the upper and lower panels of the second portion. FIG. 2 depicts airbag cushion 100 after performance of this "tucking" step. The upper and lower panels of the first portion are referenced jointly at 135 and are both positioned in between the upper and lower panels of the second portion, which are referenced jointly at 145.

As can be seen in FIG. 2, the first portion of the airbag cushion has been tucked into the second portion of the airbag cushion to a distance of about fifty percent of the length of the airbag cushion prior to the tucking step. Otherwise stated, distance D is about one-half of distance L. In some implementations of the inventive method, such as is shown in the accompanying figures, the first portion of the airbag cushion is tucked into the second portion of the airbag cushion to a distance of at least about twenty percent of the length of the airbag cushion prior to the tucking step. In some such implementations, the first portion of the airbag cushion is tucked into the second portion of the airbag cushion to a distance of between about twenty percent and about fifty percent of the length of the airbag cushion prior to the tucking step.

After tucking a portion of the airbag cushion into itself, optionally, a light tack stitch or tear stitch may be applied to two or more of the tucked layers of the airbag cushion in order to held maintain the tuck during further folding and handling of the airbag cushion. The light stitching applied to the tucked portion of the airbag cushion may be positioned in a center portion of the cushion. Moreover, it may be desirable in some embodiments to extend the stitching across no more than one-half of the total width of the cushion. The stitching may be applied to two layers of the airbag cushion or more, up to the total number of layers in the tucked portion (four in the embodiment shown in the figures). The stitch count in one embodiment includes no more than 25 threads per 100 mm, thereby allowing the stitch to break away upon inflation of the airbag cushion without damaging the airbag cushion. Of course, those having skill in the art will appreciate that other thread counts may similarly provide for a stitch that will break away cleanly upon inflation without damaging the airbag cushion.

After tucking the airbag cushion 100 into itself at one end and, optionally, applying a light stitch to the tucked portion of the airbag cushion 100, the tucked portion is folded in towards the housing 110. In the implementation shown in the drawings, the tucked portion is folded multiple times until one side of the folded tucked portion is at least approximately even with a first side 112 of the housing 110. Note that the housing need not have a rectangular cross section as does housing 110 in the accompanying figures. Thus, the term "side" is intended to encompass portions of the housing that may not be straight. For example, in embodiments having a housing with a circular cross-section, folding the tucked portion until one side is at least approximately even with a first side of the housing may refer to folding the tucked portion until one side of the folded tucked portion is approximately tangent to a portion of the housing.

FIG. 3 depicts the airbag cushion 100 after a first fold has been applied to the tucked portion. FIGS. 4A and 4B depict the airbag cushion 100 after the tucked portion has been folded multiple times until one side of the folded tucked portion is at least approximately even with a first side 112 of the housing 110. In other implementations of the method, the tucked portion may be rolled towards the housing instead of folded multiple times. The meaning of the word "fold" should therefore encompass rolling as well as more conventional "folding" as shown in FIGS. 3 and 4A-4B. As discussed in greater detail below, the term "fold" should further encompass "accordion" folding. Of course, "folding" could also comprise a combination of one or more of the above-described "folds". For example, "folding" the tucked portion until one side of the folded tucked portion is at least approximately even with a first side of the housing could comprise one or more traditional folds followed by rolling the tucked portion to the housing.

Figure 6:
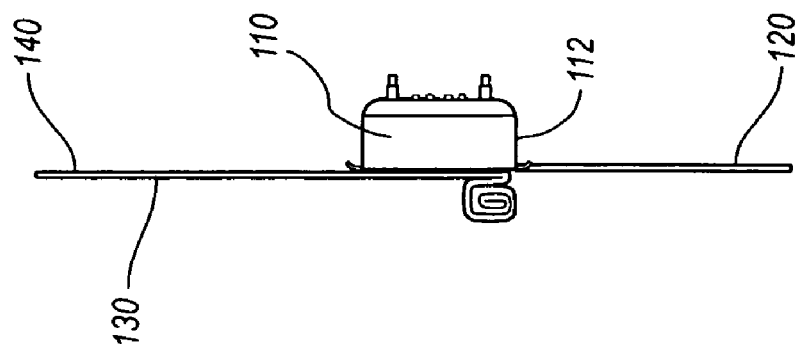
FIG. 6 is a side elevation view of the airbag cushion assembly after the folded portion has been folded over the housing opening.
Figure 5:
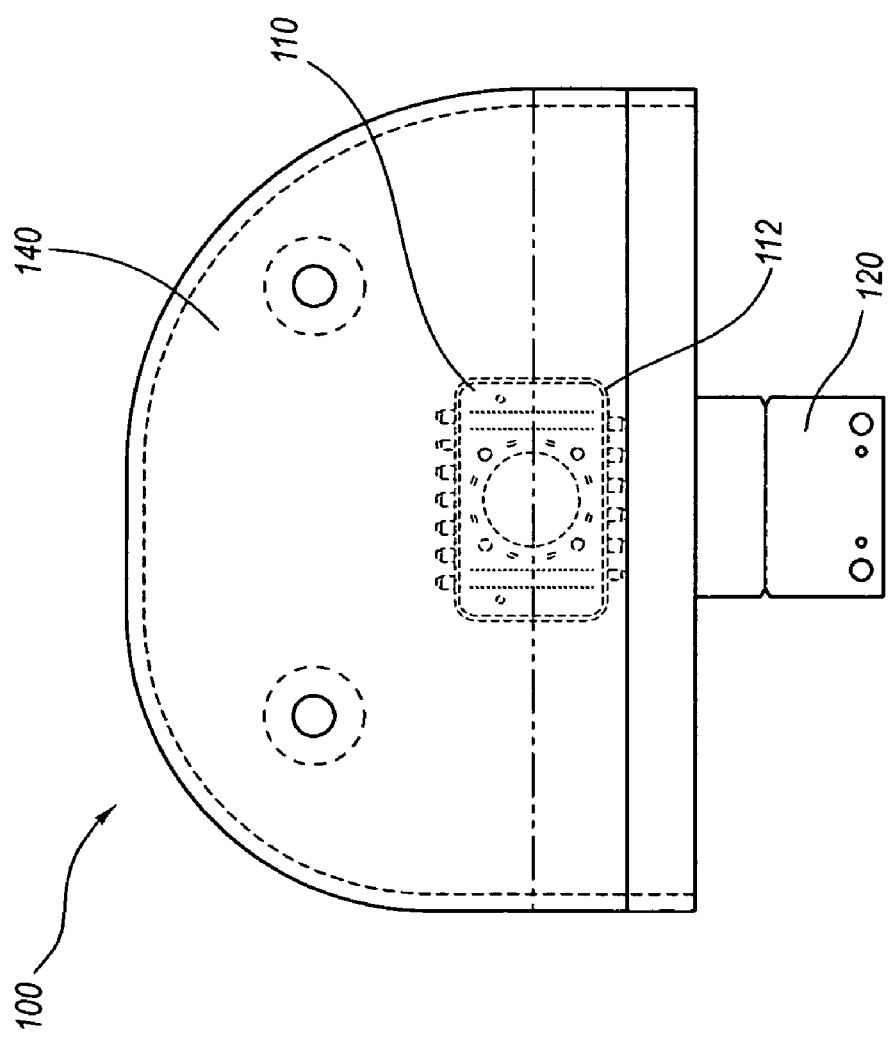
FIG. 5 is a top plan view of the airbag cushion assembly after it has been turned over such that the housing is underneath the airbag cushion.

As shown in FIGS. 5 and 6, optionally the airbag cushion assembly (including the housing 110) may be flipped over, as shown in FIG. 5, and then the folded portion rolled or otherwise folded over the housing opening such that at least a portion of the folded portion is positioned above the housing opening, as shown in FIG. 6. In FIGS. 4A-5, the tucked portion has been folded multiple times until one side of the folded tucked portion is at least approximately even with a first side 112 of the housing 110 and has been folded as such so that the remainder of the folded tucked portion of the airbag cushion 100 extends away from the housing. However, in the depicted implementation, after the steps discussed with reference to FIGS. 5 and 6 have been performed, the folded tucked portion of the airbag cushion 100 still has one side approximately even with first side 112 of housing 110, but is now positioned such that the remainder of the folded tucked portion extends towards the direction of the housing 110. A portion of the folded airbag cushion 100 may also be tucked into the housing at this time if desired.

Figures 7A, 7B, 8A, 8B, 8C:
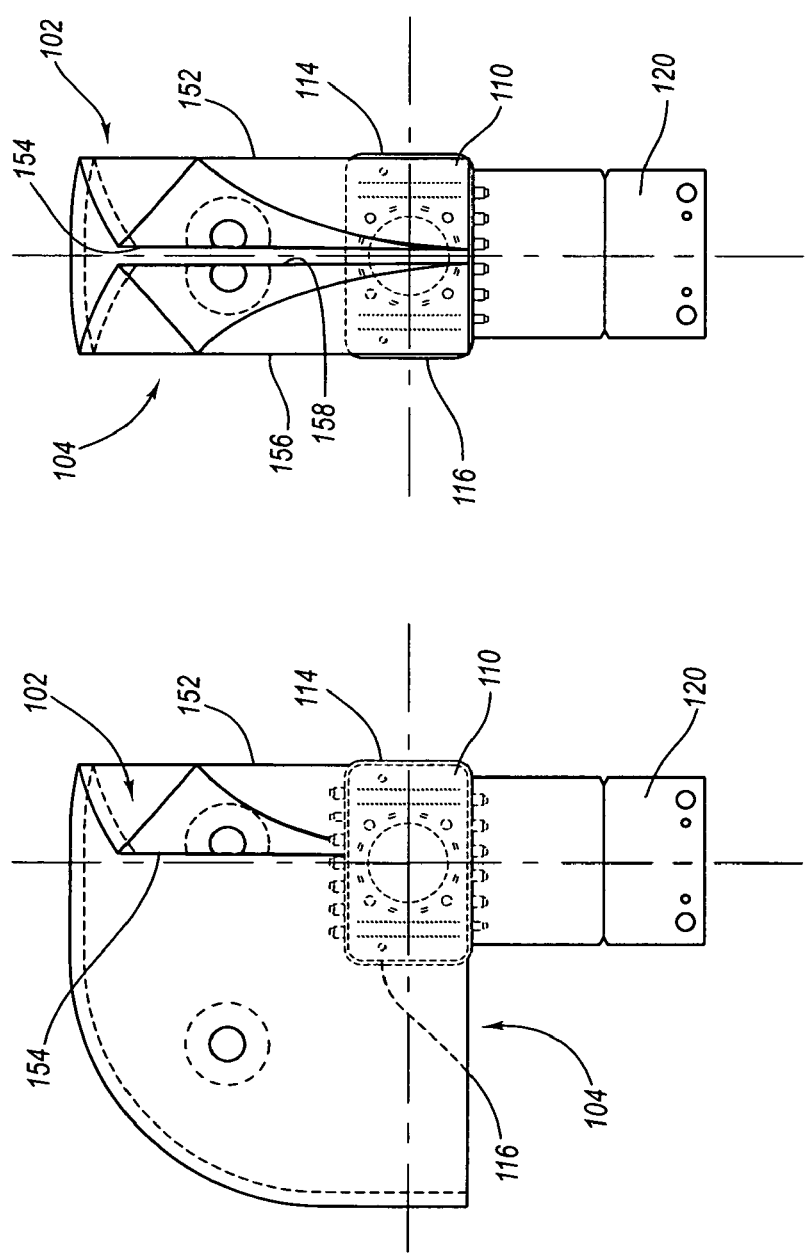
FIG. 7A is a top plan view of the airbag cushion assembly after a first half of the airbag cushion has been folded until one side of the folded first half is approximately even with a side of the housing.
FIG. 7B is a top elevation view of the airbag cushion assembly at the same stage of the folding method as shown in FIG. 7A.
FIG. 8A is a top plan view of the airbag cushion assembly after a second half of the airbag cushion has been folded until one side of the folded second half is approximately even with a side of the housing.
FIG. 8B is a top elevation view of the airbag cushion assembly at the same stage of the folding method as shown in FIG. 8A.
FIG. 8C is a side elevation view of the airbag cushion assembly at the same stage of the folding method as shown in FIGS. 8A and 8B.

After the tucked portion has been folded up to the housing, a first half 102 and a second half 104 of the airbag cushion 100 are folded in towards the housing 110. As can be seen in FIGS. 7A-8B, first half 102 of the airbag cushion 100 includes approximately half of the tucked portion and second half 104 includes the other half of the tucked portion. In the implementation shown in the drawings, first half 102 is folded until a first side 152 of the folded first half 102 of the airbag cushion is approximately even with a second side 114 of the housing 110. A second side 154 of the folded first half 102 of the airbag cushion, opposite from first side 152, is approximately aligned with the center of the housing 110, as shown in FIGS. 7A and 7B.

As best seen in FIG. 7B, in the depicted implementation first half 102 has been folded in towards housing 110 with an "accordion" fold. In other words, the folds alternate in direction such that the folded sections can be stacked on one another. Of course, other folding options are available. For instance, first half 102 may be folded multiple times in the same direction instead of back and forth as in accordion folding. Alternatively, first half 102 may be simply rolled in towards the housing 110. As previously discussed, each of the aforementioned steps should be considered within the scope of the term "fold".

As shown in FIGS. 8A-8C, second half 104 may be folded in towards housing 110 in a similar manner. Specifically, second half 104 is folded until a first side 156 of the folded second half 104 is approximately even with a third side 116 of the housing 110. A second side 158 of the folded second half 104, opposite from first side 156, is approximately aligned with the center of the housing 110.

Figure 10:
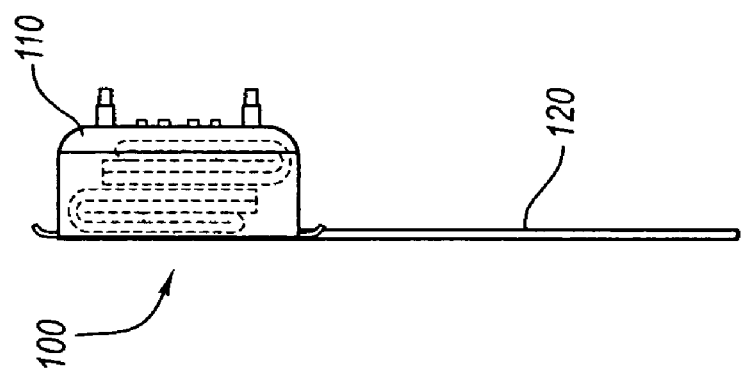
FIG. 10 is a side elevation view of the airbag cushion assembly after the airbag cushion has been folded and tucked into the housing.
Figure 9:
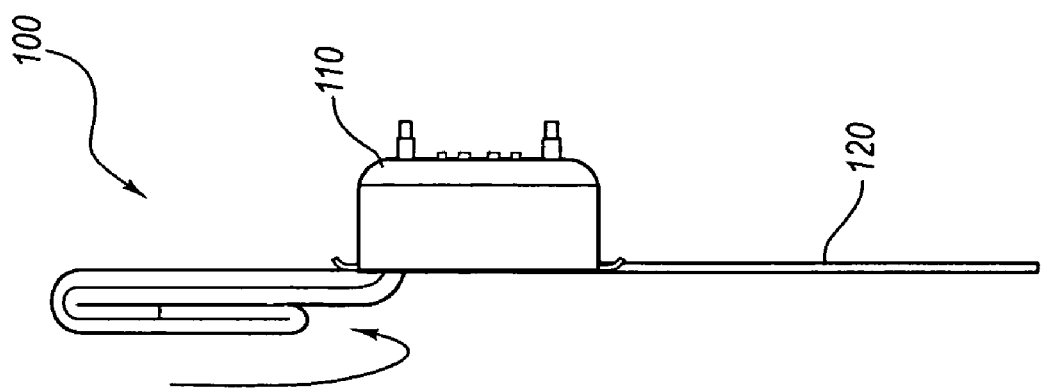
FIG. 9 is a side elevation view of the airbag cushion assembly after the airbag cushion has been partially folded towards the housing.

After first half 102 and second half 104 have been folded in towards the housing 110, the folded first and second halves of the airbag cushion may be folded again, this time together, in the same direction, and down into the housing 110. As shown in FIGS. 9 and 10, the remainder of the airbag cushion 100, which includes folded first half 102 and folded second half 104, is folded (e.g., folded end-over-end, accordion folded, or rolled) into housing 110. Packaging flap 120 may then be wrapped around the assembly and secured.

Certain implementations of the inventive method can be used to produce an airbag assembly with desirable inflation characteristics. For instance, in many of the above-described embodiments, the folding method employed causes the top of the airbag cushion to deploy first, followed by the sides. The bottom of the airbag cushion will typically be the last portion to inflate, due to the tuck, which holds the bottom portion inside the housing until the top and sides have been inflated. This may be a desirable inflation scenario for some applications.

Application of a light stitching to the tucked portion, as described in detail above, may further enhance certain desirable inflation characteristics. For example, the stitching may allow for further delay of expansion of the bottom portion. The timing of the delay may also be tuned by altering the strength and position of the stitching. Moreover, in embodiments in which the stitching is positioned in a center portion of the cushion, the unstitched sides of the airbag cushion may tend to inflate first, thereby causing the stitch to fail from the sides towards the center. Thus, the stitching and folding methods described herein may be used to provide a variety of different inflation characteristics as desired.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims.

The invention claimed is:

1. A method for folding an airbag cushion into a housing, comprising:
   obtaining an airbag cushion defined by an upper panel and a lower panel, wherein the airbag cushion is attached to a housing;
   tucking a first portion of the airbag cushion into a second portion of the airbag cushion such that the upper and lower panels of the first portion are positioned in between the upper and lower panels of the second portion;
   directly joining at least two adjacent layers of the tucked portion of the airbag cushion together, wherein the step of directly joining at least two adjacent layers is performed after the step of tucking a first portion of the airback cushion into a second portion of the airback cushion;
   folding the tucked portion until one side of the folded tucked portion is at least approximately even with a first side of the housing;
   folding a first half of the airbag cushion until a first side of the folded first half of the airbag cushion is at least approximately even with a second side of the housing, wherein the first half of the airbag cushion includes approximately half of the tucked portion, and wherein the step of folding a first half of the airbag cushion is performed after the steps of tucking a first portion of the airbag cushion and folding the tucked portion;
   folding a second half of the airbag cushion until a first side of the folded second half of the airbag cushion is at least approximately even with a third side of the housing, wherein the second half of the airbag cushion includes approximately half of the tucked portion, and wherein the step of folding a second half of the airbag cushion is performed after the steps of tucking a first portion of the airbag cushion and folding the tucked portion; and
   folding the folded first and second halves of the airbag cushion into the housing.

2. The method of claim 1, wherein the step of joining at least two layers of the tucked portion of the airbag cushion together comprises stitching at least two layers of the tucked portion of the airbag cushion together.

3. The method of claim 2, wherein a stitch placed in the tucked portion extends through each of the layers of the tucked portion.

4. The method of claim 2, wherein a stitch placed in the tucked portion is a light stitch so as to allow the stitch to break away upon inflation of the airbag cushion without damaging the airbag cushion.

5. The method of claim 2, wherein the step of stitching the tucked portion is performed before any of the folding steps.

6. The method of claim 2, wherein a stitch placed in the tucked portion extends across no more than about half of the total width of the airbag cushion.

7. The method of claim 6, wherein the stitch placed in the tucked portion is positioned in a center portion of the cushion such that, upon inflation, the unstitched sides of the airbag cushion inflate first, thereby causing the stitch to fail from the sides towards the center.

8. The method of claim 1, wherein the step of folding the tucked portion comprises rolling the tucked portion until the tucked portion is at least approximately even with a first side of the housing.

9. The method of claim 1, wherein the step of folding the tucked portion comprises folding the tucked portion multiple times.

10. The method of claim 1, wherein the step of folding a first half of the airbag cushion comprises accordion folding the first half of the airbag cushion.

11. The method of claim 1, wherein the step of folding the folded first and second halves of the airbag cushion into the housing comprises rolling the folded first and second halves of the airbag cushion into the housing.

12. The method of claim 1, wherein, following the step of folding a first half of the airbag cushion, a second side of the folded first half of the airbag cushion opposite from the first side is approximately aligned with the center of the housing.

13. The method of claim 1, wherein the first portion of the airbag cushion is tucked into the second portion of the airbag cushion to a distance of at least about twenty percent of the length of the airbag cushion prior to the tucking step.

14. An airbag cushion assembly, comprising an airbag cushion folded into a housing in accordance with the method of claim 1.

15. A method for folding an airbag cushion into a housing, comprising:
   obtaining an airbag cushion defined by an upper panel and a lower panel, wherein the airbag cushion is attached to a housing;
   tucking a first portion of the airbag cushion into a second portion of the airbag cushion such that the upper and lower panels of the first portion are positioned in between the upper and lower panels of the second portion;
   directly stitching at least two adjacent layers of the tucked portion of the airbag cushion together, wherein the step of directly stitching is performed after the step of tucking a first portion of the airback cushion into a second portion of the airback cushion;
   folding the tucked portion in towards the housing;
   folding a first half of the airbag cushion in towards the housing, wherein the first half of the airbag cushion includes approximately half of the tucked portion;
   folding a second half of the airbag cushion in towards the housing, wherein the second half of the airbag cushion includes approximately half of the tucked portion; and
   folding the folded first and second halves of the airbag cushion into the housing.

16. The method of claim 15, wherein a stitch placed in the tucked portion extends through each of the layers of the tucked portion.

17. The method of claim 15, wherein the step of folding the tucked portion in towards the housing further comprises folding the tucked portion until one side of the folded tucked portion is at least approximately even with a first side of the housing.

18. The method of claim 16, wherein the step of folding the tucked portion comprises rolling the tucked portion until the tucked portion is at least approximately even with a first side of the housing.

19. The method of claim 15, wherein the step of folding a first half of the airbag cushion is performed by folding the first half of the airbag cushion until a first side of the folded first half of the airbag cushion is at least approximately even with a second side of the housing, wherein the step of folding a second half of the airbag cushion is performed by folding the second half of the airbag cushion until a first side of the folded second half of the airbag cushion is at least approximately even with a third side of the housing, and wherein the steps of folding the first and second halves of the airbag cushion are performed after the steps of tucking a first portion of the airbag cushion and folding the tucked portion.

20. The method of claim 19, wherein, following the step of folding a first half of the airbag cushion, a second side of the folded first half of the airbag cushion opposite from the first side is approximately aligned with the center of the housing.

21. The method of claim 15, wherein a stitch placed in the tucked portion extends through each of the layers of the tucked portion.

22. The method of claim 15, wherein a stitch placed in the tucked portion is a light stitch so as to allow the stitch to break away upon inflation of the airbag cushion without damaging the airbag cushion.

23. The method of claim 15, wherein the step of stitching the tucked portion is performed before any of the folding steps.

24. The method of claim 15, wherein a stitch placed in the tucked portion extends across no more than about half of the total width of the airbag cushion.

25. The method of claim 24, wherein the stitch placed in the tucked portion is positioned in a center portion of the cushion such that, upon inflation, the unstitched sides of the airbag cushion inflate first, thereby causing the stitch to fail from the sides towards the center.

26. The method of claim 15, wherein the step of folding a first half of the airbag cushion and the step of folding a second half of the airbag cushion each comprise accordion folding the respective halves of the airbag cushion.

27. The method of claim 15, wherein the step of folding the folded first and second halves of the airbag cushion into the housing comprises rolling the folded first and second halves of the airbag cushion into the housing.

28. The method of claim 15, wherein the first portion of the airbag cushion is tucked into the second portion of the airbag cushion to a distance of at least about twenty percent of the length of the airbag cushion prior to the tucking step.

29. An airbag cushion assembly, comprising an airbag cushion folded into a housing in accordance with the method of claim 15.

30. A method for folding an airbag cushion into a housing, comprising:

obtaining an airbag cushion defined by an upper panel and a lower panel, wherein the airbag cushion is attached to a housing;

tucking a first portion of the airbag cushion into a second portion of the airbag cushion such that the upper and lower panels of the first portion are positioned in between the upper and lower panels of the second portion, wherein the first portion of the airbag cushion is tucked into the second portion of the airbag cushion to a distance of at least about twenty percent of the length of the airbag cushion prior to the tucking step;

stitching at least two layers of the tucked portion of the airbag cushion together, wherein a stitch placed in the tucked portion is a light stitch so as to allow the stitch to break away upon inflation of the airbag cushion without damaging the airbag cushion;

folding the tucked portion until one side of the folded tucked portion is at least approximately even with a first side of the housing;

folding a first half of the airbag cushion until a first side of the first half of the folded airbag cushion is at least approximately even with a second side of the housing, wherein the first half of the airbag cushion includes approximately half of the tucked portion, and wherein the step of folding a first half of the airbag cushion is performed after the steps of tucking a first portion of the airbag cushion and folding the tucked portion;

folding a second half of the airbag cushion until a first side of the folded second half of the airbag cushion is at least approximately even with a third side of the housing, wherein the second half of the airbag cushion includes approximately half of the tucked portion, and wherein the step of folding a second half of the airbag cushion is performed after the steps of tucking a first portion of the airbag cushion and folding the tucked portion; and folding the folded first and second halves of the airbag cushion into the housing.

31. An airbag cushion assembly, comprising an airbag cushion folded into a housing in accordance with the method of claim 30.

32. The method of claim 30, wherein the stitch placed in the tucked portion is positioned in a center portion of the cushion such that, upon inflation, the unstitched sides of the airbag cushion inflate first, thereby causing the stitch to fail from the sides towards the center.

* * * * *